(12) United States Patent
Fukawatase et al.

(10) Patent No.: US 9,016,718 B2
(45) Date of Patent: Apr. 28, 2015

(54) VEHICLE OCCUPANT RESTRAINT SYSTEM

(71) Applicants: Osamu Fukawatase, Miyoshi (JP); Daisaku Ito, Tokokawa (JP)

(72) Inventors: Osamu Fukawatase, Miyoshi (JP); Daisaku Ito, Tokokawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/088,625

(22) Filed: Nov. 25, 2013

(65) Prior Publication Data
US 2014/0151984 A1 Jun. 5, 2014

(30) Foreign Application Priority Data

Dec. 3, 2012 (JP) ................................. 2012-264645

(51) Int. Cl.
| B60R 21/207 | (2006.01) |
| B60R 21/231 | (2011.01) |
| B60R 21/233 | (2006.01) |
| B60R 21/235 | (2006.01) |
| B60R 21/239 | (2006.01) |
| B60R 21/16 | (2006.01) |
| B60R 21/2338 | (2011.01) |

(52) U.S. Cl.
CPC ......... B60R 21/23138 (2013.01); B60R 21/233 (2013.01); *B60R 21/235* (2013.01); *B60R 21/239* (2013.01); *B60R 2021/161* (2013.01); *B60R 2021/23146* (2013.01); *B60R 2021/23161* (2013.01); *B60R 2021/23386* (2013.01)

(58) Field of Classification Search
CPC ........................ B60R 21/207; B60R 21/23138
USPC ........................................................ 280/730.2
See application file for complete search history.

(56) References Cited

U.S. PATENT DOCUMENTS

| 5,636,862 | A | * | 6/1997 | Cheung et al. | 280/730.2 |
| 5,730,464 | A | * | 3/1998 | Hill | 280/743.2 |
| 6,065,772 | A | * | 5/2000 | Yamamoto et al. | 280/730.2 |
| 7,549,672 | B2 | * | 6/2009 | Sato et al. | 280/730.2 |
| 7,618,057 | B2 | * | 11/2009 | Pinsenschaum et al. | 280/730.2 |
| 7,793,973 | B2 | * | 9/2010 | Sato et al. | 280/730.2 |
| 7,942,444 | B2 | * | 5/2011 | Steinbach et al. | 280/743.2 |
| 8,210,566 | B2 | * | 7/2012 | Fukawatase et al. | 280/730.1 |
| 8,267,424 | B2 | * | 9/2012 | Tomitaka et al. | 280/730.2 |
| 8,282,126 | B2 | * | 10/2012 | Wiik et al. | 280/730.2 |
| 8,360,469 | B2 | * | 1/2013 | Wiik et al. | 280/743.2 |
| 8,480,123 | B2 | * | 7/2013 | Choi et al. | 280/730.2 |
| 8,684,408 | B2 | * | 4/2014 | Thomas et al. | 280/743.2 |

(Continued)

FOREIGN PATENT DOCUMENTS

| JP | 2008-126783 A | 6/2008 |
| JP | 2009-280023 A | 12/2009 |

(Continued)

*Primary Examiner* — Nicole Verley
(74) *Attorney, Agent, or Firm* — Gifford, Krass, Sprinkle, Anderson & Citkowski, P.C.

(57) ABSTRACT

In a vehicle occupant restraint, a sub bag is inflated and deployed in an early stage at a high pressure prior to a main bag as a gas that is discharged from an inflator to the sub bag is supplied to the main bag via a communication opening. Accordingly, a lower section of the sub bag can favorably be interposed in a narrow space between a waist of a occupant and a console box. In addition, an upper section of the sub bag is supported by a top surface of the console box, and this the sub bag is firmly supported by the console box. Therefore, the main bag is supported to a same degree as when the console box is extended upward by a height of the sub bag.

10 Claims, 8 Drawing Sheets

(56) References Cited

U.S. PATENT DOCUMENTS

| | | | |
|---|---|---|---|
| 2003/0168836 A1* | 9/2003 | Sato et al. | 280/730.2 |
| 2004/0232666 A1* | 11/2004 | Sato et al. | 280/730.2 |
| 2005/0104342 A1* | 5/2005 | Jackson et al. | 280/730.2 |
| 2006/0119083 A1* | 6/2006 | Peng et al. | 280/730.2 |
| 2009/0302584 A1* | 12/2009 | Sugimoto et al. | 280/730.1 |
| 2011/0278826 A1* | 11/2011 | Fukawatase et al. | 280/730.2 |
| 2012/0091697 A1 | 4/2012 | Wiik et al. | |
| 2013/0328294 A1* | 12/2013 | Fukawatase et al. | 280/730.2 |
| 2014/0042733 A1* | 2/2014 | Fukawatase | 280/730.2 |
| 2014/0103625 A1* | 4/2014 | Thomas et al. | 280/730.2 |

FOREIGN PATENT DOCUMENTS

| | | |
|---|---|---|
| JP | 2012-081958 A | 4/2012 |
| WO | 2010050015 A1 | 5/2012 |

* cited by examiner

VEHICLE OCCUPANT RESTRAINT SYSTEM

INCORPORATION BY REFERENCE

The disclosure of Japanese Patent Application No. 2012-264645 filed on Dec. 3, 2012 including the specification, drawings and abstract is incorporated herein by reference in its entirety.

BACKGROUND OF THE INVENTION

1. Field of the Invention

The present invention relates to a vehicle occupant restraint system.

2. Description of Related Art

A occupant restraint system disclosed in Japanese Patent Application Publication No. 2012-081958 (JP 2012-081958 A) includes an airbag (far-side airbag) that can restrain a head and a neck of a occupant from an inner side of a vehicle. A bottom section of the far-side airbag is deployed to a position below a top surface of a console. When the occupant applies a load to the far-side airbag, the far-side airbag partially contacts the console and thus receives lateral support. Accordingly, the far-side airbag is restricted from collapsing to the console side (vehicle inner side).

Furthermore, in the occupant restraint system illustrated in FIG. 9 of JP 2012-081958 A, the airbag (far-side airbag) includes a first inflatable chamber (large-volume airbag) and a second inflatable chamber (small-volume airbag). An upper section of the large-volume airbag is deployed to the side of the head of the occupant while a bottom section thereof is deployed to a position below the top surface of the console. Meanwhile, the small-volume airbag is deployed above the console from the side of the large-volume airbag. The small-volume airbag functions like a wedge between the console and the large-volume airbag and also functions to extend its surface that faces the console in an upward direction with respect to the large-volume airbag. Accordingly, the small-volume airbag provides more structural support to the large-volume airbag than the console alone.

Although JP 2012-081958 A does not disclose a specific installation structure of the small-volume airbag, it can be considered from FIG. 9 that the small-volume airbag is sewn to the side of the large-volume airbag. When such a structure is adopted, a deployed position of the small-volume airbag is changed according to a deployed state of the large-volume airbag. In this point, the bottom section (lower section) of the large-volume airbag is deployed to a narrow space between the console and a waist of the occupant. Therefore, when the bottom section of the large-volume airbag is not reliably deployed in an early stage, the small-volume airbag cannot be deployed to a set position. Consequently, there is a possibility that the large-volume airbag cannot be sufficiently restricted from collapsing to the console side.

SUMMARY OF THE INVENTION

The present invention provides a vehicle occupant restraint system that can effectively restrict movement of a far-side airbag to an inner side in a vehicle width direction during restraint of a occupant.

A first aspect of the present invention relates to the vehicle occupant restraint system. The vehicle occupant restraint system includes: a vehicle seat having a seat cushion on which the occupant is seated and a seatback that functions as a backrest for the occupant; a center console including a console box that is provided on the inner side in the vehicle width direction of the vehicle seat; an inflator that is provided in the vehicle seat and discharges a gas when activated; and the far-side airbag that is provided in a side of the seatback on the inner side in the vehicle width direction, in which a main bag and a sub bag are connected and communicated to each other via a communication opening, in which a lower section of the sub bag is inflated and deployed between a waist of the occupant and the console box by supplying the gas to the sub bag, in which an upper section of the sub bag is inflated and deployed to a top surface side of the console box, in which the gas supplied to the sub bag is supplied to the main bag via the communication opening, in which a lower section of the main bag is inflated and deployed between the upper section of the sub bag and the occupant, and in which an upper section of the main bag is inflated and deployed to a side of a head of the occupant.

In the above aspect, when a vehicle encounters a side collision, for example, the inflator is activated to discharge the gas. The gas is supplied to the sub bag of the far-side airbag, and the gas supplied to the sub bag is further supplied to the main bag via the communication opening. Accordingly, the sub bag is inflated and deployed prior to the main bag. In the sub bag, the lower section is inflated and deployed between the waist of the occupant and the console box while the upper section is inflated and deployed to the top surface side (above) of the console box. Meanwhile, in the main bag, the lower section is inflated and deployed between the upper section of the sub bag and the occupant while the upper section is inflated and deployed to the side of the head of the occupant.

As described above, in the above aspect, the sub bag is inflated and deployed in the early stage prior to the main bag. Therefore, the lower section of the sub bag can favorably be interposed in a narrow space between the waist of the occupant and the console box regardless of an inflated and deployed state of the main bag. In addition, in the sub bag, not only the lower section is supported by a side surface of the console box but also the upper section is supported by the top surface of the console box. Accordingly, the sub bag is firmly supported by the console box. Then, the lower section of the main bag is supported from the inner side in the vehicle width direction by the upper section of the sub bag that is firmly supported by the console box, just as described. Therefore, when the occupant who moves inertially to the inner side in the vehicle width direction by an impact during the side collision is restrained by the far-side airbag, the far-side airbag can effectively be restricted from moving to the inner side in the vehicle width direction.

As described above, it is possible in the vehicle occupant restraint system according to the first aspect of the present invention to effectively restrict movement of the far-side airbag to the inner side in the vehicle width direction during restraint of the occupant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A description will hereinafter be made on a vehicle occupant restraint system 10 according to a first embodiment of the present invention with reference to FIG. 1 to FIG. 4. It should be noted that an arrow FR, an arrow UP, and arrow OUT, which are appropriately shown in each drawing, respectively indicate a front direction (traveling direction), an upper direction, and an outer side in a vehicle width direction of a vehicle. Unless otherwise noted, when a description is hereinafter made using a front-rear direction or an up-down direction, the front and rear in a vehicle front-rear direction or the up and down in a vehicle up-down direction is respectively indicated.
(Structure)

Figure 1:
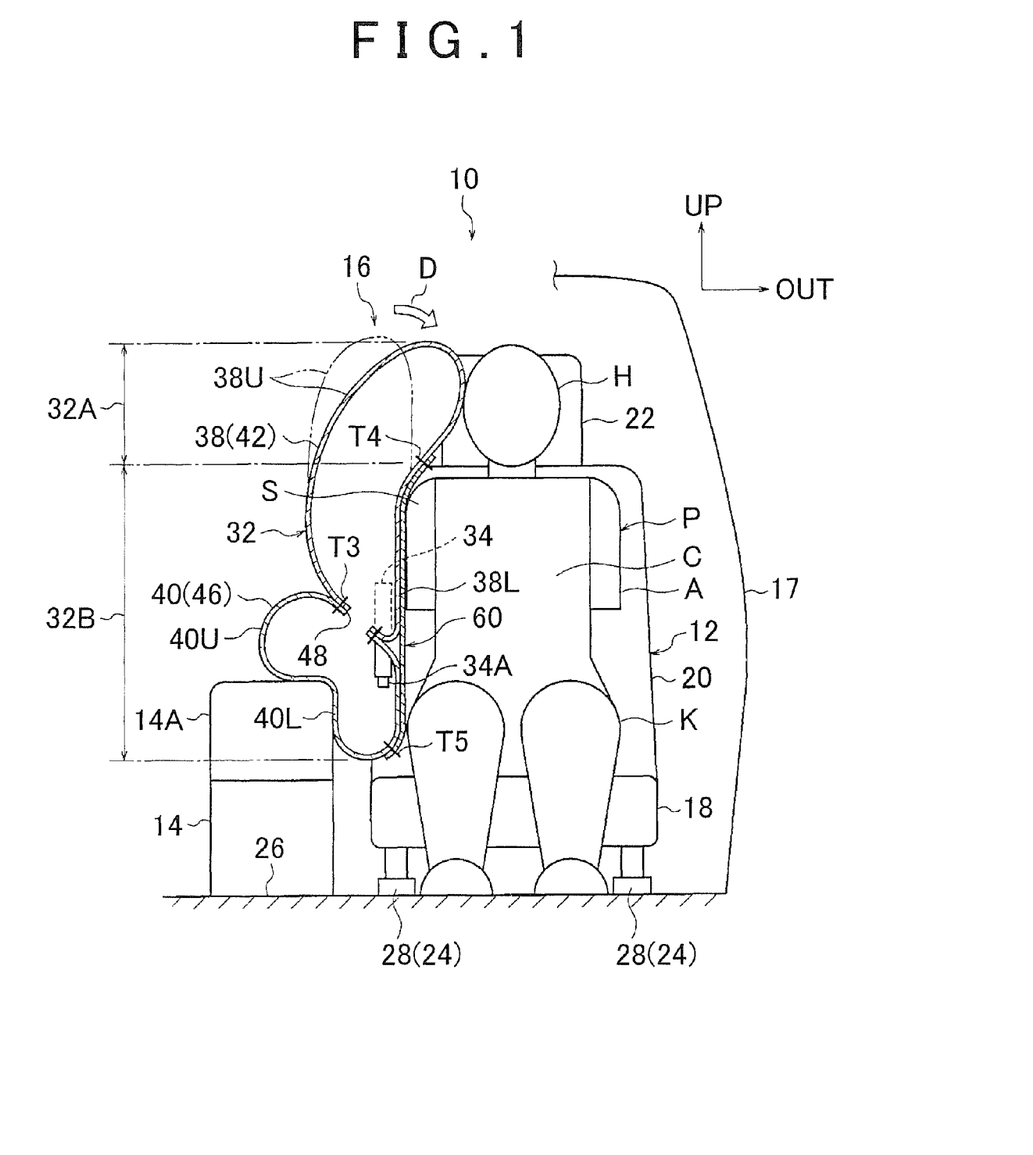
FIG. 1 is a cross-sectional view of a structure of a vehicle occupant restraint system according to a first embodiment of the present invention that is seen from a front side of a vehicle.

As shown in FIG. 1, the vehicle occupant restraint system 10 according to this embodiment is configured of a vehicle seat 12 (here, a driver seat for a left-handle drive vehicle), a center console 14 that is provided on the inner side in the vehicle width direction of the vehicle seat 12, and a far-side airbag system 16. It should be noted that a vehicle side door 17 is schematically shown in FIG. 1.

The vehicle seat 12 includes a seat cushion 18 on which a occupant P is seated, a seatback 20 that is connected to a rear end of the seat cushion 18 and functions as a backrest for the occupant P, and a headrest 22 that is connected to an upper end of the seatback 20 to support a head H of the occupant P.

The seat cushion 18 is connected to a vehicle body floor 26 via a seat slide mechanism 24 (front-rear position adjustment mechanism). The seat slide mechanism 24 includes a right and left pair of slide rails 28 that connects the seat cushion 18 to be slidable in the vehicle front-rear direction with respect to the vehicle body floor 26 and a locking mechanism (not shown) that locks the sliding of the seat cushion 18. A front-rear sliding position of the vehicle seat 12 with respect to the vehicle body floor 26 can be adjusted by canceling the lock by the locking mechanism.

Figure 2:
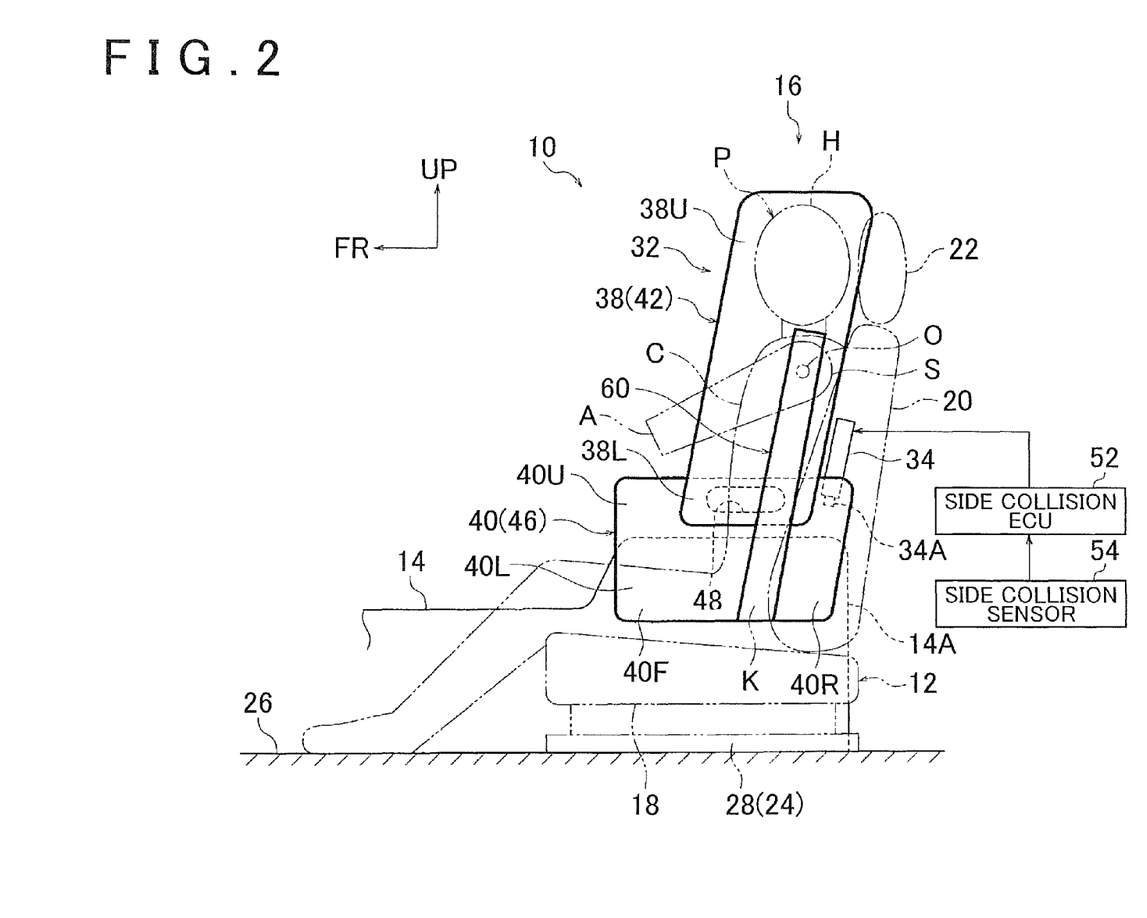
FIG. 2 is a side view of the vehicle occupant restraint system according to the first embodiment of the present invention that is seen from an outer side in a vehicle width direction.

In this embodiment, a front-rear direction, a right-left direction (width direction), and an up-down direction of the vehicle seat 12 respectively correspond to the front-rear direction, the right-left direction (width direction), and the up-down direction of the vehicle. In FIG. 1 and FIG. 2, a dummy P for a crash test is seated on the vehicle seat 12 instead of the actual occupant. The dummy P is a World Side Impact Dummy (WorldSID), for example. The dummy P is hereinafter referred to as the "occupant P" for simple explanation.

The center console 14 is positioned between the vehicle seat 12 as the driver seat and a passenger seat (not shown) at a center of a cabin in the vehicle width direction. A console box 14A as a storing section is integrally provided in the rear of the center console 14. The console box 14A also functions as an armrest for supporting an arm A of the occupant P on the inner side in the vehicle width direction. A lid (not shown) for opening and closing the console box 14A is provided on top of the console box 14A.

The far-side airbag system 16 is a system for mainly protecting a occupant positioned on the opposite side from a collision side during a side collision of the vehicle. As primary components, the far-side airbag system 16 includes a far-side airbag 32 (hereinafter simply referred to as the "airbag 32") that is disposed in a side of the seatback 20 on the inner side in the vehicle width direction and an inflator 34 (gas generating means) that discharges gas into the airbag 32.

The airbag 32 is modularized (unitized) together with the inflator 34 and is disposed (stored) in the side of the seatback 20 on the inner side in the vehicle width direction in a folded state. The airbag 32 is inflated and deployed to a front side of the seat (inner side of the occupant P in the vehicle width direction) by gas pressure that is generated from the inflator 34 (see illustrated states in FIG. 1 and FIG. 2). It should be noted that, unless otherwise noted, the front-rear and up-down directions of the airbag 32 in the description below indicate an inflating and deployed direction of the airbag 32 and substantially correspond to the front-rear and up-down directions of the vehicle.

Figure 3:
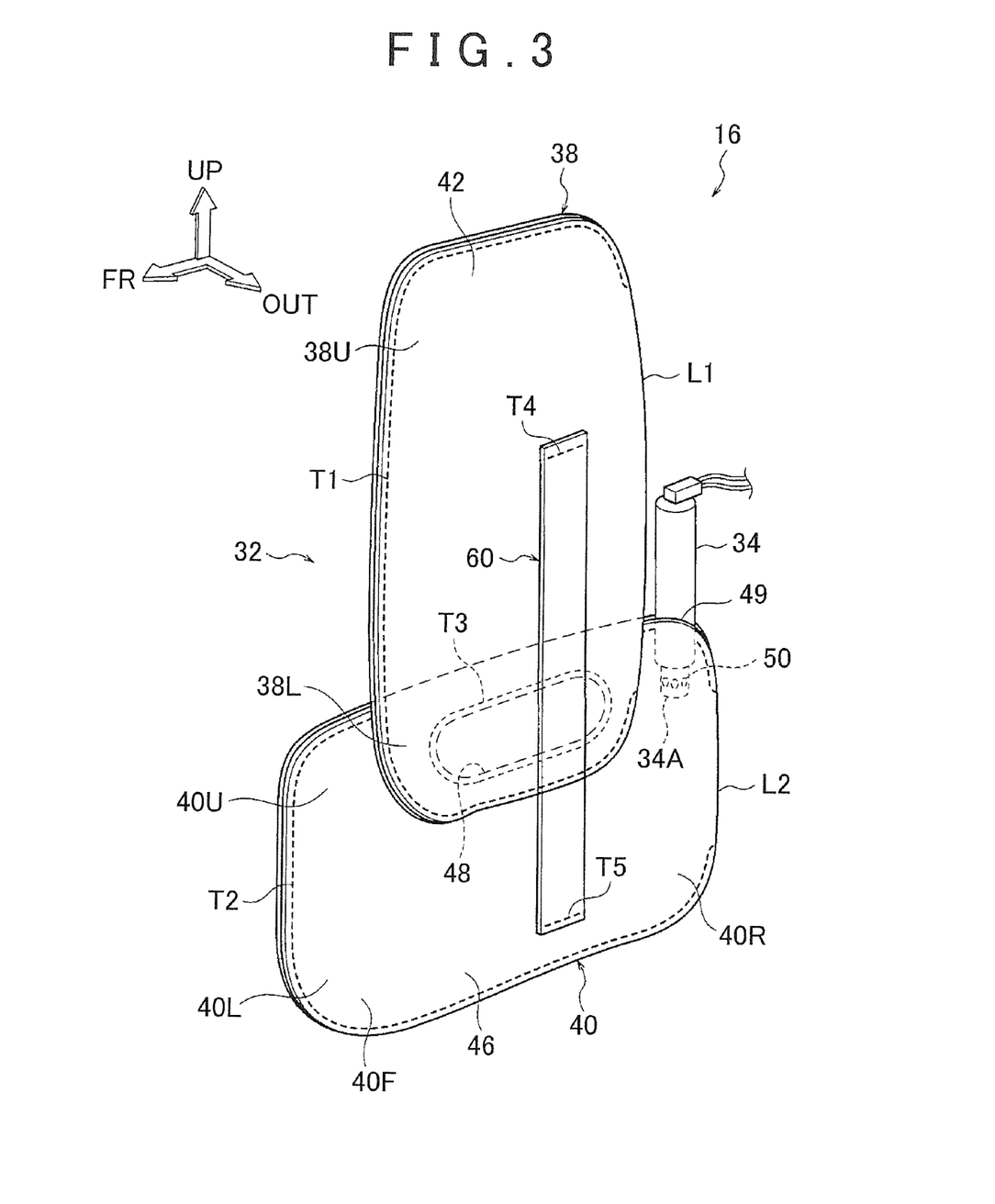
FIG. 3 is a perspective view of structures of main components of a far-side airbag system included in the vehicle occupant restraint system according to the first embodiment of the present invention.

The airbag 32 is configured of a main bag 38, a sub bag 40 that is formed to have a smaller volume than the main bag 38, and a strap 60 that connects the main bag 38 and the sub bag 40. As shown in FIG. 3, the main bag 38 is formed in a long bag shape in which a piece of base fabric 42 that is formed by cutting a nylon or polyester fabric material, for example, is folded into two halves along a folding line L1 and is then sewn on its outer peripheral edge in a sewing section T1 (not shown in FIG. 1 and FIG. 2). FIG. 3 shows a plane development of the airbag 32.

The main bag 38 is disposed such that, in the plane development and in a inflated and deployed state, the folding line L1 is located at the rear end and that one side portion of the base fabric 42 via the folding line L1 faces the outer side in the vehicle width direction (the occupant P side) while another side portion of the base fabric 42 via the folding line L1 faces the inner side in the vehicle width direction (the console box 14A side). The rear end of the main bag 38 is fastened to a seatback frame (not shown) as a framework of the seatback 20. As shown in FIG. 2, the main bag 38 is formed in a substantially rectangular shape (substantially oval shape) having long sides along the vehicle up-down direction when the inflated and deployed state thereof is seen in the vehicle width direction.

Similar to the main bag 38, the sub bag 40 is formed to have a long bag shape in which a piece of base fabric 46 that is formed by cutting a nylon or polyester fabric material, for example, is folded into two halves along a folding line L2 and is then sewn on its outer peripheral edge in a sewing section T2 (not shown in FIG. 1 and FIG. 2).

The sub bag 40 is disposed such that, in the plane development and in the inflated and deployed state, the folding line L2 is located at the rear end and that one side portion of the base fabric 46 via the folding line L2 faces the outer side in the vehicle width direction (the occupant P side) while another side portion of the base fabric 46 via the folding line L2 faces the inner side in the vehicle width direction (the console box 14A side). The rear end of the sub bag 40 is fastened to the seatback frame, which is described above. As shown in FIG. 2, the sub bag 40 is formed in a substantially rectangular shape (substantially oval shape) having long sides along the vehicle front-rear direction when the inflated and deployed state thereof is seen in the vehicle width direction.

The structure of the main bag 38 is not limited to that in which a piece of the base fabric 42 is sewn. Instead, two pieces of base fabric may be layered and sewn on outer peripheral edges to form the main bag 38. The same can be said for the sub bag 40. In addition, a method of manufacturing the main bag 38 and the sub bag 40 is not limited to sewing. For example, the main bag 38 and the sub bag 40 may be manufactured in a double-woven method (so-called OPW method) by an automatic loom.

In the plane development shown in FIG. 3, one end in a longitudinal direction (lower end) of the main bag 38 is overlapped with one end in a width direction (upper end) in an intermediate portion in the longitudinal direction (intermediate portion in the front-rear direction) of the sub bag 40 from the outer side in the vehicle width direction. In this overlapped portion, the other side portion (portion that faces the inner side in the vehicle width direction) of the base fabric 42 and the one side portion (portion that faces the occupant P side) of the base fabric 46 are sewn in a sewing section T3 (not shown in FIG. 2). Accordingly, the main bag 38 and the sub bag 40 are integrally connected to each other.

The sewing section T3 is set in an oval shape having a long side in the vehicle front-rear direction. A communication opening 48 is formed on the inside of the sewing section T3. The communication opening 48 is configured of a long hole that is formed by the base fabric 42, 46 and is formed in the oval shape having a longitudinal side in the vehicle front-rear direction like the sewing section T3. The inside of the main bag 38 and the inside of the sub bag 40 are communicated with each other through the communication opening 48.

In the plane development and the inflated and deployed state, a length dimension in the vehicle front-rear direction of the sub bag 40 is set to be longer than that of the main bag 38. The dimension in the vehicle front-rear direction of the sub bag 40 is set to be the same as a dimension in the vehicle front-rear direction of the console box 14A, for example.

In addition, the sub bag 40 is formed such that, in the plane development and the inflated and deployed state, a front projecting section 40F provided in a front section is projected forward from the main bag 38 while a rear projecting section 40R provided in a rear section is projected rearward from the main bag 38. An inflator insertion opening 49 for inserting the inflator 34 in the sub bag 40 is formed in the upper end of the rear projecting section 40R. It should be noted that the inflator insertion opening 49 may be provided anywhere in the sub bag 40 and thus is not limited to be provided in the upper end. In this embodiment, the inflator insertion opening 49 is formed by omitting the sewing section T2 in a section where the inflator insertion opening 49 is to be formed. However, the inflator insertion opening 49 is not limited to this, and an opening (through hole) that is formed in the base fabric 46 of the sub bag 40 may be used as the inflator insertion opening.

Furthermore, the main bag 38 and the sub bag 40 are connected by the strap 60 (long member) in the airbag 32. The strap 60 is formed in a long band shape by a flexible material that cannot easily be stretched. The strap 60 is provided such that a longitudinal direction thereof substantially follows the up-down direction on the outer side in the vehicle width direction (the occupant P side) with respect to the main bag 38 and the sub bag 40 in the plane development and the inflated and deployed state. One end in the longitudinal direction (upper end) of the strap 60 is sewn in a sewing section T4 (not shown in FIG. 2) to an intermediate portion in the up-down direction in the one side portion (portion that faces the occupant P side) of the base fabric 42 in the main bag 38. Meanwhile, another end in the longitudinal direction (lower end) of the strap 60 is sewn in a sewing section T5 (not shown in FIG. 2) to a lower end side of the one side portion (portion that faces the occupant P side) in the sub bag 40.

As shown in FIG. 2 and FIG. 3, the inflator 34 is a so-called cylinder type and is formed in a cylindrical shape. The inflator 34 is disposed such that an axial direction thereof follows a height direction of the seatback 20 and that a lower side thereof is inserted in the sub bag 40 from the inflator insertion opening 49. An upper and lower pair of stud bolts (not shown) is projected from an outer periphery of the inflator 34 to a vehicle rear side or to the outer side in the vehicle width direction. These stud bolts penetrate the above-mentioned seatback frame or a bracket that is fixed to the seatback frame, and a nut (not shown) is screwed to each tip thereof. Accordingly, the inflator 34 is fixedly fastened to the seatback frame.

As shown in FIG. 2 and FIG. 3, a gas discharging section 34A is provided at a lower end of the inflator 34. In the gas discharging section 34A, plural gas discharging ports 50 (see FIG. 3) are formed to align in a circumferential direction of the inflator 34. Therefore, when the inflator 34 is activated, a gas is discharged radially from the plural gas discharging ports 50. As shown in FIG. 2, a side collision ECU 52 that is installed in the vehicle is electrically connected to the inflator 34. A side collision sensor 54 for detecting a side collision of the vehicle is electrically connected to the side collision ECU 52. The side collision ECU 52 and the side collision sensor 54 are components of the far-side airbag system 16.

The side collision ECU 52 activates the inflator 34 when detecting a side collision of the vehicle (or unavoidableness thereof) based on a signal from the side collision sensor 54. More specifically, the far-side airbag system 16 according to this embodiment is mounted to the vehicle seat 12 that is the driver seat for the left-handle drive vehicle. Accordingly, when the side collision ECU 52 detects that another vehicle collided with the side (right side) on the passenger seat side of the vehicle, the inflator 34 is activated. In a case where a pre-crash sensor for predicting (estimating) a side collision is electrically connected to the side collision ECU 52, the inflator 34 may be activated when the side collision ECU 52 predicts a side collision based on a signal from the pre-crash sensor.

In the vehicle occupant restraint system 10 configured as above, once the inflator 34 is activated, the gas is discharged from the plural gas discharging ports 50 that are provided at the lower end of the inflator 34. The gas discharged from the plural gas discharging ports 50 is supplied to the sub bag 40 and also to the main bag 38 via the communication opening 48. Because the gas discharged from the inflator 34 is supplied to the main bag 38 via the sub bag 40, just as described, the sub bag 40 is inflated and deployed in an early stage prior to the main bag 38, and an internal pressure of the sub bag 40 becomes higher than that of the main bag 38.

In the sub bag 40, a lower section 40L is inflated and deployed between a waist K of the occupant P and the console box 14A while an upper section 40U is inflated and deployed to a top surface side of (above) the console box 14A and abutted against the top surface of the console box 14A. Meanwhile, in the main bag 38, a lower section 38L is inflated and deployed between the upper section 40U of the sub bag 40 and the occupant P while an upper section 38U is inflated and deployed to the side of the head H of the occupant P. The main bag 38 is formed in a size that is at least large enough to restrain the head H, a shoulder S, and a chest C of the occupant P.

When the main bag 38 and the sub bag 40 are inflated and deployed as described above, the strap 60 is stretched in the up-down direction on the outer side of the main bag 38 and the sub bag 40 in the vehicle width direction. Accordingly, a portion of the main bag 38 (a free section 32A shown in FIG. 1: a portion that is held by only one side) above a connecting section with the strap 60 (the sewing section T4) is adapted to collapse to the occupant P side by tension of the strap 60 (see an arrow D in FIG. 1). In this case, a region in a vicinity of the sewing section T4 serves as a rotational center of the free section 32A. It should be noted that the inflated and deployed state of the main bag 38 in a case where the strap 60 is not provided is shown in a two-dot chain line in FIG. 1.

As shown in FIG. 2, when the inflated and deployed states of the main bag 38 and the sub bag 40 are seen in the vehicle width direction, the strap 60 is connected to the main bag 38 and the sub bag 40 so as to overlap with a center O of the shoulder S of the occupant P. It should be noted that, in this embodiment, a position of the center O of the shoulder S corresponds to an axial position of a bolt that is provided in the shoulder S of the dummy P.

Figure 4A:
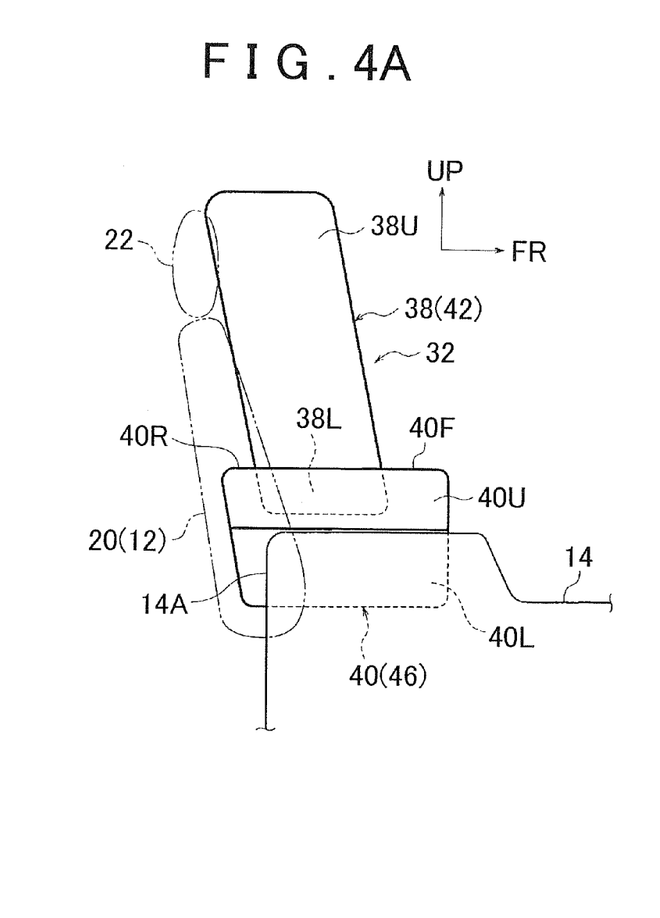
FIG. 4A is a side view for showing a partial structure of the vehicle occupant restraint system according to the first embodiment of the present invention and also showing a state that a vehicle seat is positioned in a rear end within its sliding range.
Figure 4B:
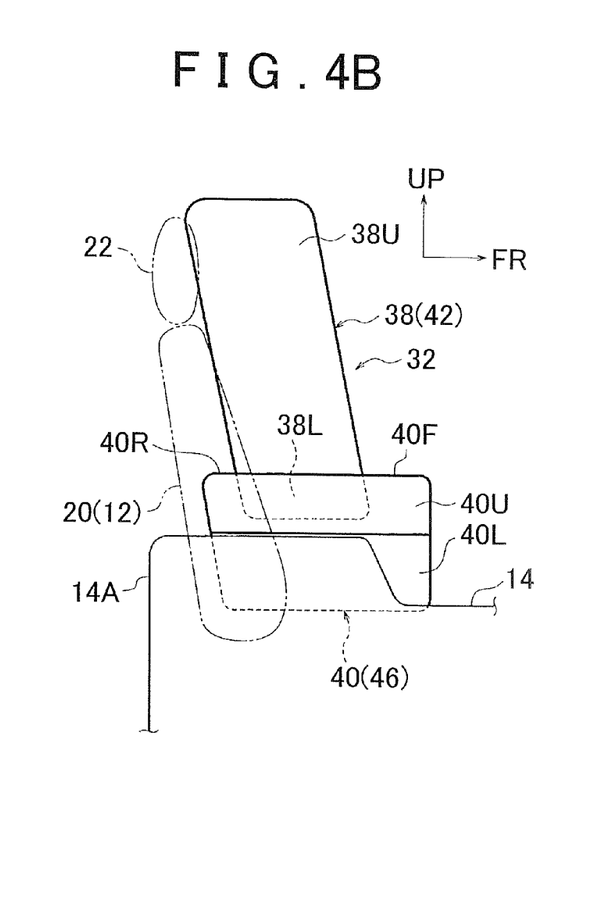
FIG. 4B is a side view for showing the partial structure of the vehicle occupant restraint system according to the first embodiment of the present invention and also showing a state that the vehicle seat is positioned in a front end within its sliding range.

In this embodiment, the vehicle seat 12 is configured such that a lower surface of the sub bag 40 is abutted against or faces the top surface of the console box 14A in proximity regardless of the position of the vehicle seat 12 with respect to the vehicle body floor 26 within its sliding range between a rear end (a position shown in FIG. 4A: rearmost) and a front end (a position shown in FIG. 4B: frontmost) (the seat cushion 18 is not shown in FIG. 4A and FIG. 4B).

(Operations and Effects)

Next, operations and effects of this embodiment will be described.

In the vehicle occupant restraint system 10 configured as above, once the side collision ECU 52 detects a side collision of the vehicle based on a signal from the side collision sensor 54, the inflator 34 is activated by the side collision ECU 52 to discharge the gas from the gas discharging ports 50. The gas discharged from the gas discharging ports 50 is supplied to the sub bag 40 of the far-side airbag 32 and is also supplied to the main bag 38 via the communication opening 48. Just as described, the gas discharged from the inflator 34 is supplied to the main bag 38 through the sub bag 40. Therefore, the sub bag 40 is inflated and deployed at a high pressure in the early stage prior to the main bag 38. In the sub bag 40, the lower section 40L is inflated and deployed between the waist K of the occupant P and the console box 14A while the upper section 40U is inflated and deployed above (to the top surface side of) the console box 14A. Meanwhile, in the main bag 38, the lower section 38L is inflated and deployed between the upper section 40U of the sub bag 40 and the occupant P while the upper section 38U is inflated and deployed to the side of the head H of the occupant P.

As described above, the sub bag 40 is inflated and deployed in the early stage prior to the main bag 38 in the present invention. Therefore, the lower section 40L of the sub bag 40 can favorably be interposed in a narrow space between the waist K of the occupant P and the console box 14A regardless of the inflated and deployed state of the main bag 38.

In addition, in the sub bag 40, not only the lower section 40L is supported by the side surface of the console box 14A but also the upper section 40U is supported by the top surface of the console box 14A. Accordingly, the sub bag 40 is firmly held by the console box 14A and is restricted from moving to the inner side in the vehicle width direction. Thus, the lower section 38L of the main bag 38 is supported from the inner side in the vehicle width direction by the upper section 40U of the sub bag 40 that is firmly supported by the console box 14A, just as described.

Furthermore, the internal pressure of the sub bag 40 becomes higher than that of the main bag 38. This allows the main bag 38 to be supported to the same degree as when the console box 14A is extended upward by the height of the sub bag 40. Therefore, when the occupant P who moves inertially to the inner side in the vehicle width direction by an impact during the side collision is restrained by the airbag 32, the airbag 32 can effectively be restricted from moving to the inner side in the vehicle width direction. As a result, it is possible to improve occupant protection performance by the airbag 32.

Moreover, in this embodiment, when the main bag 38 is inflated by following the sub bag 40 of the airbag 32, the strap 60 that is connected to both of the bags 38, 40 is stretched in the up-down direction on the outer side of both of the bags 38, 40 in the vehicle width direction, that is, the occupant P side. Accordingly, the portion of the main bag 38 (the free section 32A shown in FIG. 1) above the connecting section with the strap 60 (the sewing section T4) can collapse to the occupant P side by the tension of the strap 60.

When the occupant P is restrained by the main bag 38, not only the lower section 38L of the main bag 38 is supported by the sub bag 40, but also a portion of the main bag 38 below the sewing section T4 is supported by the tension of the strap 60. In other words, because a portion of the airbag 32 below the sewing section T4 (a fixed section 32B shown in FIG. 1) is supported by the console box 14A and the tension of the strap 60, mainly the free section 32A moves (collapses) to the inner side in the vehicle width direction. That is, in the airbag 32, a dimension in the up-down direction of the free section 32A that is likely to collapse to the inner side in the vehicle width direction can be reduced due to the strap 60. Therefore, it is possible to further effectively restrict movement of the airbag 32 to the inner side in the vehicle width direction.

In this embodiment, once the sub bag 40 and the main bag 38 are inflated and deployed, the strap 60 that is stretched in the up-down direction on the occupant P side of both of the bags 38, 40 overlaps with the center O of the shoulder S of the occupant P when seen in the vehicle width direction. Accordingly, because the shoulder S of the occupant P can directly be supported by the strap 60, it is possible to effectively restrict inertial movement of the occupant P to the inner side in the vehicle width direction. As a result, it is possible to further effectively restrict the movement of the far-side airbag 32 to the inner side in the vehicle width direction.

In this embodiment, the sub bag 40 is formed such that the dimension in the vehicle front-rear direction thereof is larger in the inflated and deployed state than that of the main bag 38 and that it is projected to the front of the vehicle from the main bag 38. Accordingly, the sub bag 40 can be inflated and deployed above the console box 14A regardless of the front-rear sliding position of the vehicle seat 12. In addition, because a large contact area between the sub bag 40 and the console box 14A can be secured, it is possible to stably support the main bag 38 through the sub bag 40.

As described above, in this embodiment, the sub bag 40 whose dimension in the vehicle front-rear direction is set to be larger in the inflated and deployed state than that of the main bag 38 is projected to the front of the vehicle from the main bag 38. Accordingly, it is possible to secure a large contact area between the sub bag 40 and the top surface of the console box 14A that extends to the front of the vehicle from the seatback 20.

In this embodiment, the sub bag 40 is made by sewing the base fabric 46 that is different from the base fabric 42 used for the main bag 38. Therefore, the sub bag 40 can be set in such a shape that the sub bag 40 receives a reaction force from the top surface of the console box 14A in a favorable manner. In addition, because the sub bag 40 is formed to be long in the vehicle front-rear direction, it is possible to secure the large contact area between the sub bag 40 and the top surface of the console box 14A while restraining an increase in volume of the sub bag 40.

In this embodiment, the gas discharging ports 50 for the inflator 34 are provided in the sub bag 40 of the airbag 32. Therefore, it is possible with a simple structure to supply the gas into the sub bag 40 in the early stage.

In this embodiment, the sub bag 40 is provided with the rear projecting section 40R that is projected to the rear side of the vehicle from the main bag 38, and the inflator insertion opening 49 is formed in the upper end of the rear projecting section 40R. Accordingly, it is possible with the simple structure to insert and dispose the lower side of the inflator 34 in the sub bag 40.

Next, other embodiments of the present invention will be described. It should be noted that the structure and operations that are basically the same as those of the first embodiment are denoted by the same reference numerals as those used in the first embodiment, and the description thereof is not repeated.

Second Embodiment

Figure 5:
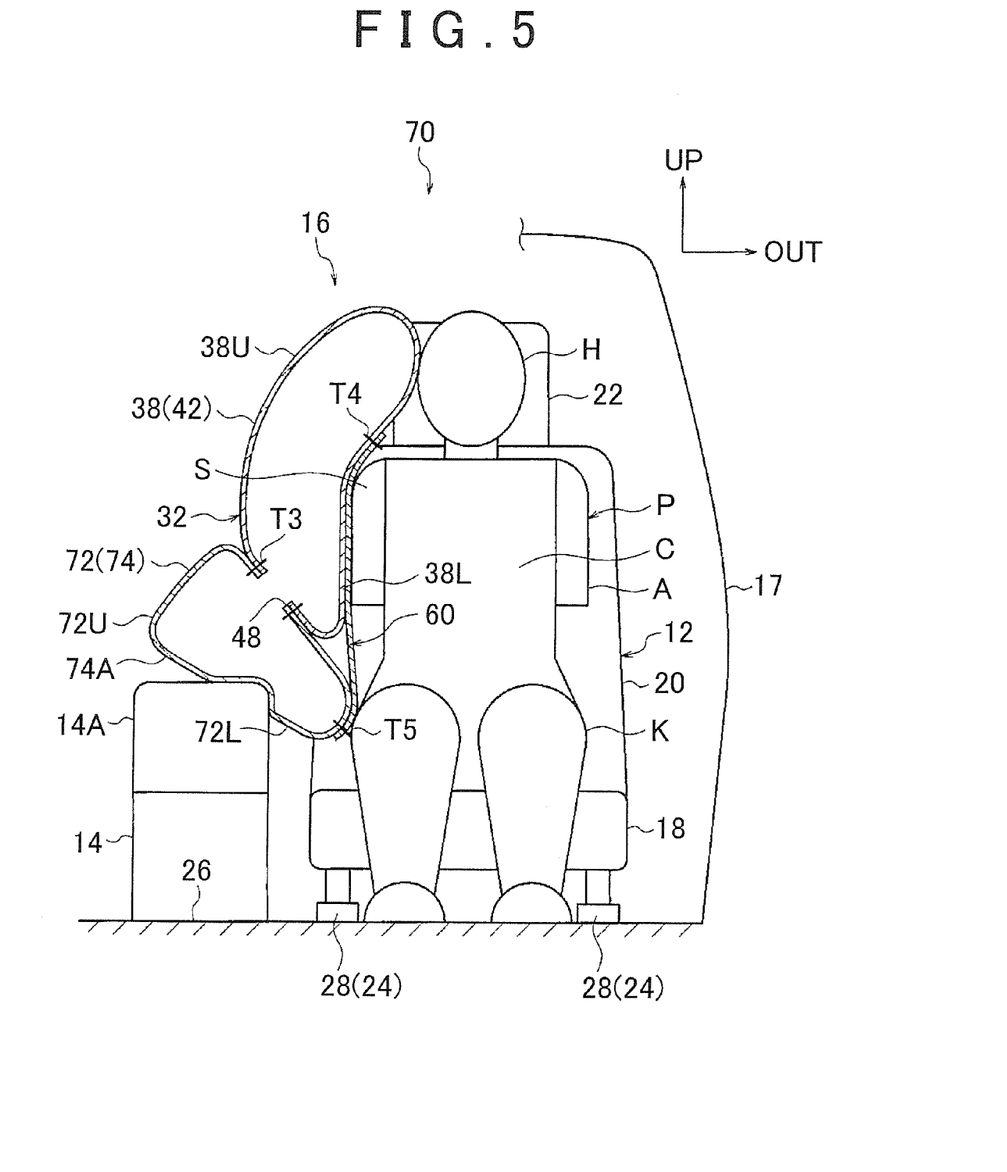
FIG. 5 is a cross-sectional view of the structure of the vehicle occupant restraint system according to a second embodiment of the present invention that is seen from the front side of the vehicle.
Figure 6:
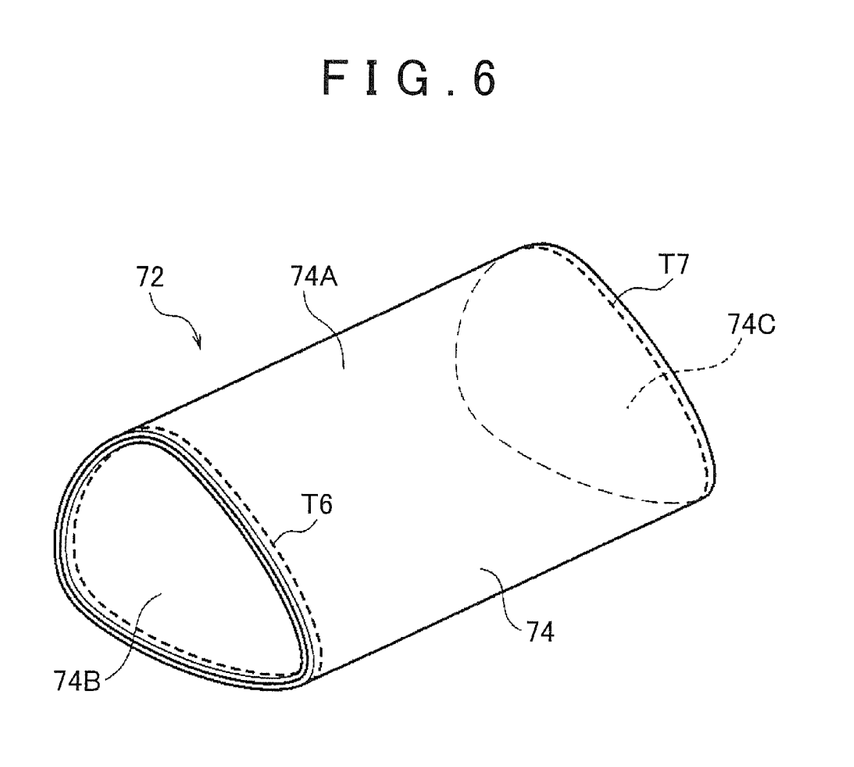
FIG. 6 is a schematic perspective view of a sub bag as a component of the far-side airbag system included in the vehicle occupant restraint system according to the second embodiment of the present invention.
Figure 7:
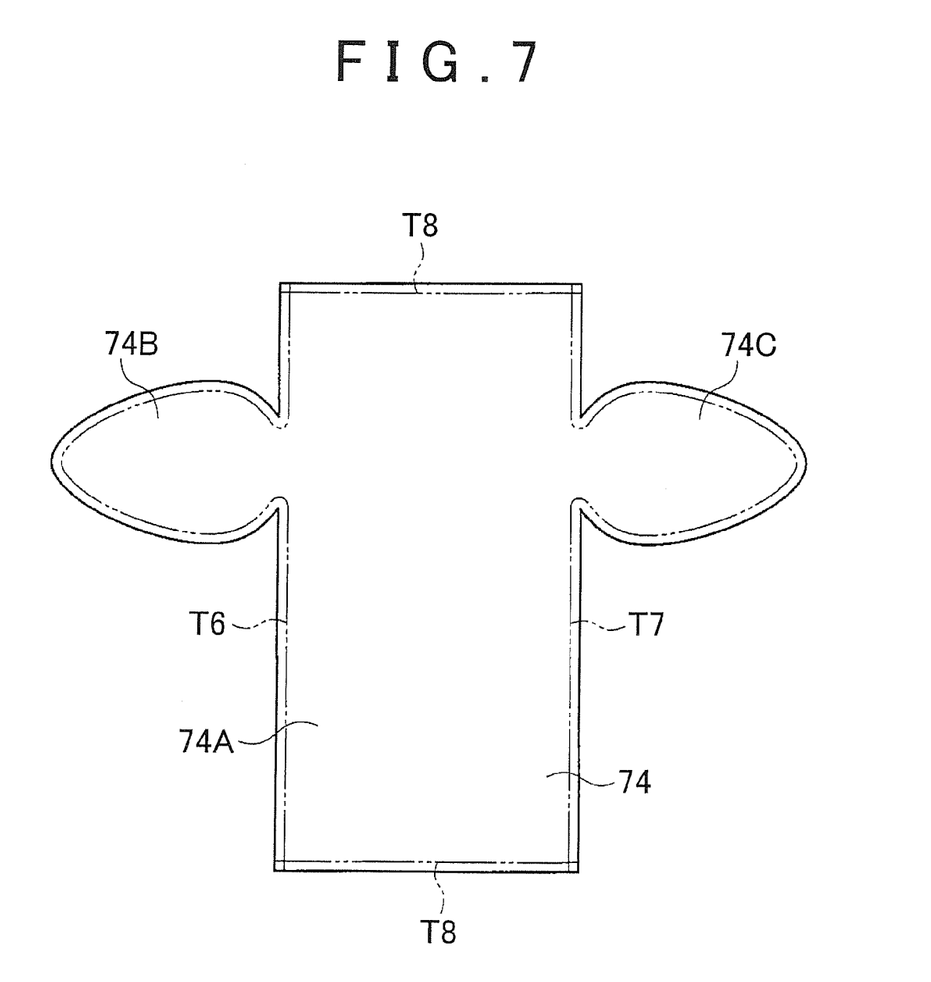
FIG. 7 is a plan development for showing a structure of base fabric of the sub bag according to the second embodiment of the present invention.

FIG. 5 is a cross-sectional view of a structure of a vehicle occupant restraint system 70 according to a second embodiment of the present invention that is seen from the front side of the vehicle. In this embodiment, a structure of a sub bag 72 in the airbag 32 is different from that of the sub bag 40 in the first embodiment. As shown in FIG. 5 and FIG. 6, the sub bag 72 is formed to be a bag that is inflated and deployed in a substantially wedge shape. The sub bag 72 is made by sewing base fabric 74 that is shown in FIG. 7 and is configured of a front and rear pair of sub side surface panels 74B, 74C that faces the vehicle front-rear direction in the inflated and deployed state and a sub outer peripheral panel 74A that is sewn on outer peripheries of the paired sub side surface panels 74B, 74C in sewing sections T6, T7. It should be noted that the sub outer peripheral panel 74A is sewn on both ends in a longitudinal direction in a sewing section T8 shown in FIG. 7 (not shown in FIG. 5 and FIG. 6).

The sub bag 72 is sewn to the lower section 38L of the main bag 38 in the sewing section T3. The inside of the main bag 38 is communicated with the inside of the sub bag 72 via the communication opening 48 (not shown in FIG. 6 and FIG. 7). As shown in FIG. 5, in the sub bag 72, a lower section 72L is inflated and deployed between the waist K of the occupant P and the console box 14A while an upper section 72U is inflated and deployed to the top surface side of the console box 14A. These points are the same as in the sub bag 40 of the first embodiment. However, as shown in FIG. 5, the sub bag 72 is formed such that a dimension in the up-down direction thereof in the inflated and deployed state is thicker in the top surface side of the console box 14A than in the occupant P side. The structure of the airbag 32 is the same as that in the first embodiment except for the above.

In this embodiment, when the sub bag 72 of the airbag 32 is inflated and deployed, the dimension in the up-down direction of the sub bag 72 becomes thicker in the top surface side of the console box 14A, that is, a side to which the main bag 38 collapses during restraint of the occupant than in the occupant P side. Then, a thick portion of the sub bag 72 is interposed between the top surface of the console box 14A and the main bag 38. Accordingly, the reaction force from the top surface of the console box 14A can favorably be applied to the main bag 38 via the sub bag 72. Therefore, it is possible to further effectively restrict the movement of the main bag 38 to the inner side in the vehicle width direction.

In the second embodiment, the paired sub side surface panels 74B, 74C and the sub outer peripheral panel 74A are integrally cut out from a piece of a fabric material. However, the structure is not limited to this. The paired sub side surface panels 74B, 74C and the sub outer peripheral panel 74A may be cut out separately from the fabric material and sewn.

Third Embodiment

Figure 8:
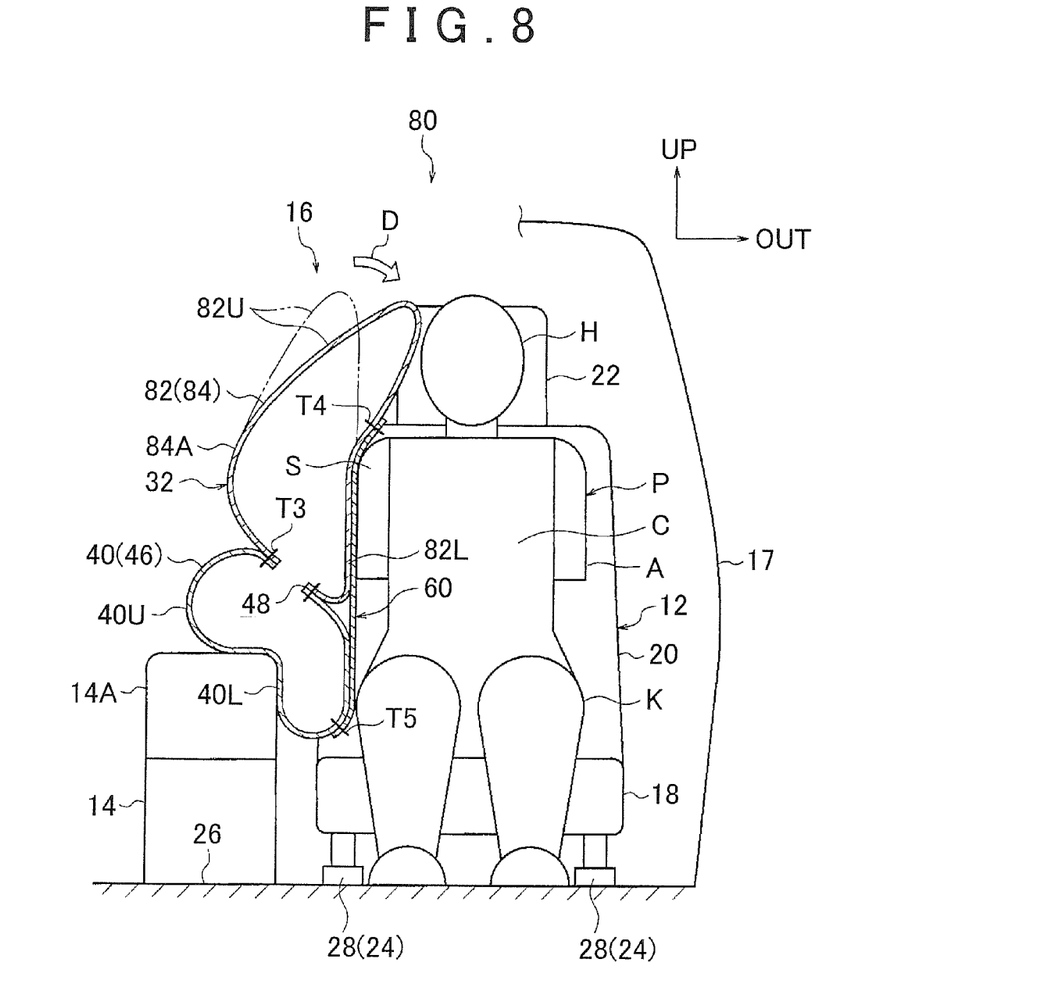
FIG. 8 is a cross-sectional view of the structure of the vehicle occupant restraint system according to a third embodiment of the present invention that is seen from the front side of the vehicle.

FIG. 8 is a cross-sectional view of a vehicle occupant restraint system 80 according to a third embodiment of the present invention that is seen from the front side of the vehicle. In this embodiment, a structure of a main bag 82 in the airbag 32 differs from that of the main bag 38 in the first embodiment. The main bag 82 is formed to be a bag that is inflated and deployed in a substantially wedge shape by sewing base fabric 84 that is cut out in a same shape as the base fabric 74 of the second embodiment, and is configured of a front and rear pair of main side surface panels (not shown) that faces the vehicle front-rear direction in the inflated and deployed state and a main outer peripheral panel 84A that is sewn on an outer peripheries of the paired main side surface panels.

The main bag 82 is sewn to the upper section 40U of the sub bag 40 in the sewing section T3. The inside of the main bag 82 is communicated with the inside of the sub bag 40 via the communication opening 48. In the main bag 82, a lower section 82L is inflated and deployed between the upper section 40U of the sub bag 40 and the occupant P while an upper section 82U is inflated and deployed to the side of the head H of the occupant P. These points are the same as in the main bag 38 of the first embodiment. However, the main bag 82 is formed such that a dimension in the vehicle width direction thereof in the inflated and deployed state is thinner in the upper section 82U side than in the lower section 82L side. The structure of the airbag 32 is the same as that in the first embodiment except for the above.

In this embodiment, when the main bag 82 of the airbag 32 is inflated and deployed, the dimension in the vehicle width direction of the main bag 82 becomes thinner in the upper section 82U side, that is, a side to restrain the head H of the occupant P than in the lower section 82L side. Accordingly, a peripheral length of the upper section 82U in the main bag 82 is short, and thus the upper section 82U of the main bag 82 (the free section 32A) is less likely to collapse to the inner side in the vehicle width direction during restraint of the head H.

Therefore, it is possible to further effectively restrict movement of the main bag 82 to the inner side in the vehicle width direction.

Supplementary Explanation of the Embodiments

In each of the above embodiments, a check valve may be provided in the communication opening 48 of the airbag 32 to maintain a state where the internal pressure of each of the sub bags 40, 72 is higher than that of each of the main bags 38, 82 for a long time period.

In each of the above embodiments, the inflator 34 is activated when another vehicle collides with the side (right side) on the passenger seat side of the vehicle. However, the structure of the present invention is not limited to this. The inflator 34 may be activated when another vehicle collides with the side (left side) on the vehicle seat 12, which is the driver seat. In this case, the passenger P moves to the inner side in the vehicle width direction (opposite side of the collision) by a swing-back behavior or the like after the occupant P is restrained by a side airbag (not shown) that is provided in a side of the seatback 20 on the outer side in the vehicle width direction of the seatback 20 in the vehicle seat 12. At this time, the occupant can be restrained by the airbag 32. In such a case, it is preferred that the timing to supply the gas to the airbag 32 be slightly delayed from the timing to supply the gas to the side airbag.

In each of the embodiments, the description has been made for the case where the present invention is applied to the vehicle seat 12 that is the driver seat for the left-handle drive vehicle. However, the application of the present invention is not limited to this. The present invention can be applied either to a vehicle seat that is disposed on the right side of the vehicle or to a vehicle seat that is disposed on the left side of the vehicle.

In each of the embodiments, the communication opening 48 is formed to be long in the longitudinal direction of each of the sub bags 40, 72 in the inflated and deployed state. However, the present invention is not limited to this structure. The shape and the number of the communication opening 48 can appropriately be changed. For example, the plural communication openings may be provided and aligned in the longitudinal direction (the vehicle front-rear direction) of the sub bag in the inflated and deployed state.

In each of the embodiments, the airbag 32 includes the strap 60. However, the present invention is not limited to this structure, and the airbag may not include the strap. Even in this case, it is possible to effectively restrict the movement of the far-side airbag to the inner side in the vehicle width direction by supporting the main bag by the sub bag.

In each of the embodiments, the gas discharged from the inflator 34 into the sub bags 40, 72 is respectively supplied to the main bags 38, 82 via the communication opening 48. However, the present invention is not limited to this structure. The gas that is discharged from the inflator may separately be supplied to the main bag and the sub bag by a rectifying cloth such as an inner tube. Even in this case, it is necessary to set an amount of the gas that is distributed to the main bag and the sub bag in a manner that the sub bag is inflated and deployed prior to the main bag.

In each of the embodiments, the sub bag 40 is formed to have a smaller volume than the main bag 38. However, the present invention is not limited to this structure, and the sub bag may be formed to have a larger volume than the main bag. Even in this case, it is still necessary that the sub bag is inflated and deployed prior to the main bag, that the lower section of the sub bag is immediately interposed in the narrow space between the waist of the occupant and the console box, and that the upper section of the sub bag is immediately supported by the top surface of the console box.

In addition to the above, various modifications can be made to practice the present invention. It is needless to say that a range of the right of the present invention is not limited to each of the above embodiments.

What is claimed is:

1. A vehicle occupant restraint system comprising:
a vehicle seat having a seat cushion on which an occupant is seated and a seatback that functions as a backrest for the occupant;
a center console including a console box that is provided on an inner side in a vehicle width direction of the vehicle seat;
an inflator that is provided in the vehicle seat and discharges a gas when activated; and
a far-side airbag that is provided in a side of the seatback on the inner side in the vehicle width direction, the far-side airbag includes a main bag and a sub bag that are connected and communicated to each other via a communication opening, the sub bag is inflated and deployed prior to the main bag, the main bag has a volume greater than a volume of the sub bag,
wherein a lower section of the sub bag is inflated and deployed between a waist of the occupant and the console box by supplying the gas to the sub bag, and an upper section of the sub bag is inflated and deployed to a top surface side of the console box,
wherein the gas supplied to the sub bag is supplied to the main bag via the communication opening,
wherein a lower section of the main bag is inflated and deployed between the upper section of the sub bag and the occupant, and an upper section of the main bag is inflated and deployed to a side of a head of the occupant.

2. The vehicle occupant restraint system according to claim 1 wherein
the main bag is connected to the sub bag by a strap, and
the strap is stretched in an up-down direction on an outer side in the vehicle width direction of the main bag and the sub bag when the main bag and the sub bag are in inflated and deployed states.

3. The vehicle occupant restraint system according to claim 2 wherein
the strap is connected to the main bag and the sub bag so as to overlap with a center of a shoulder of the occupant when the main bag and the sub bag in the inflated and deployed states are seen in the vehicle width direction.

4. The vehicle occupant restraint system according to claim 1 wherein
the sub bag has a front and rear pair of sub side surface panels that face a vehicle front-rear direction in an inflated and deployed state and a sub outer peripheral panel that is sewn to outer peripheries of the paired sub side surface panels, and
the sub bag is formed such that a dimension in an up-down direction thereof in the inflated and deployed state is thicker in the top surface side of the console box than in the occupant side.

5. The vehicle occupant restraint system according to claim 1 wherein
the main bag is formed such that a dimension in the vehicle width direction thereof in the inflated and deployed state is thinner in an upper section than in a lower section.

6. The vehicle occupant restraint system according to claim 1 wherein
the sub bag is formed such that a dimension in a vehicle front-rear direction thereof is larger in the inflated and deployed state than that of the main bag and is projected to the front of a vehicle from the main bag.

7. The vehicle occupant restraint system according to claim 1 wherein
a gas discharging port for the inflator is provided in the sub bag.

8. The vehicle occupant restraint system according to claim 1 wherein
the sub bag is made by sewing basic fabric that is different from basic fabric that constitutes the main bag.

9. The vehicle occupant restraint system according to claim 1 wherein
the sub bag is formed to be long in a vehicle front-rear direction.

10. The vehicle occupant restraint system according to claim 1 wherein
the sub bag is provided with a rear projecting section that is projected to rear of the vehicle from the main bag, and an inflator insertion opening is formed in an upper end of the rear projecting section.

* * * * *